(12) United States Patent
Kakinuma et al.

(10) Patent No.: US 12,421,676 B2
(45) Date of Patent: Sep. 23, 2025

(54) ROAD SURFACE EVALUATION APPARATUS AND ROAD SURFACE EVALUATION METHOD

(71) Applicant: Honda Motor Co., Ltd., Tokyo (JP)

(72) Inventors: Atsuki Kakinuma, Tokyo (JP); Akira Iihoshi, Tokyo (JP); Yasuo Oishi, Tokyo (JP); Takeo Tokunaga, Tokyo (JP); Hiroyuki Onimaru, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 180 days.

(21) Appl. No.: 17/927,206

(22) PCT Filed: May 19, 2021

(86) PCT No.: PCT/JP2021/018956
§ 371 (c)(1),
(2) Date: Nov. 22, 2022

(87) PCT Pub. No.: WO2021/241350
PCT Pub. Date: Dec. 2, 2021

(65) Prior Publication Data
US 2023/0243113 A1      Aug. 3, 2023

(30) Foreign Application Priority Data
May 28, 2020  (JP) .................. 2020-093108

(51) Int. Cl.
*E01C 23/01*  (2006.01)
*G01B 21/30*  (2006.01)

(52) U.S. Cl.
CPC .............. *E01C 23/01* (2013.01); *G01B 21/30* (2013.01)

(58) Field of Classification Search
None
See application file for complete search history.

(56) References Cited

U.S. PATENT DOCUMENTS

2012/0330493 A1*  12/2012  Hanatsuka .............. B60T 8/172
                                                                  701/29.1

FOREIGN PATENT DOCUMENTS

| JP | 2002012138 A | 1/2002 | | |
|----|--------------|--------|---|---|
| JP | 2015184816 A | 10/2015 | | |
| WO | WO-2014195604 A1 * | 12/2014 | ........... | B60C 11/246 |
| WO | WO-2018025341 A1 * | 2/2018 | ............. | E01C 23/01 |

OTHER PUBLICATIONS

Translation of Ikegami (Year: 2018).*
Translation of Pita-Gil (Year: 2014).*
International Search Report; Application PCT/JP2021/018956; Jul. 27, 2021.

* cited by examiner

Primary Examiner — Matthew G Marini
(74) Attorney, Agent, or Firm — Duft & Bornsen, PC

(57) ABSTRACT

A road surface evaluation apparatus including a microprocessor. The microprocessor is configured to perform acquiring driving information (including information indicating a motion of a vehicle while driving and position information of the vehicle, map information including information on a road on which the vehicle is traveling, and vehicle information including unique information of the vehicle), deriving a roughness value indicating a roughness of a road surface of the road on which the vehicle is traveling based on the driving information, correcting the roughness value based on the vehicle information, and outputting the corrected roughness value in association with the road information.

8 Claims, 7 Drawing Sheets

| MODEL | GRADE | SUSPENSION | | TIRE | |
|---|---|---|---|---|---|
| | | TYPE | CORRECTION FACTOR | TYPE | CORRECTION FACTOR |
| ABC | HIGH | SS_11 | $\alpha 11$ | tr_11 | $\beta 11$ |
| | STANDARD | SS_12 | $\alpha 12$ | tr_12 | $\beta 12$ |
| | LOW | SS_13 | $\alpha 13$ | tr_13 | $\beta 13$ |
| XYZ | HIGH | SS_21 | $\alpha 21$ | tr_21 | $\beta 21$ |
| | | | | | |

ROAD SURFACE EVALUATION APPARATUS AND ROAD SURFACE EVALUATION METHOD

CROSS-REFERENCE TO RELATED APPLICATION

This application is a National Stage of PCT international application Ser. No. PCT/JP2021/018956 filed on May 19, 2021 which designates the United States, incorporated herein by reference, and which is based upon and claims the benefit of priority from Japanese Patent Application No. 2020-093108, filed on May 28, 2020, the entire contents of which are incorporated herein by reference.

TECHNICAL FIELD

This invention relates to a road surface evaluation apparatus and a road surface evaluation method that evaluate a road surface profile representing unevenness of a road surface.

BACKGROUND ART

As a prior-art device of this type, it is known that a road surface profile representing the unevenness of the road surface on which a vehicle has traveled is detected based on the acceleration in the lateral direction (lateral to the driving direction) measured by an acceleration sensor installed in the vehicle (see, for example, Patent Literature 1).

CITATION LIST

Patent Literature

Patent Literature 1: Japanese Unexamined Patent Publication No. 2002-12138

DISCLOSURE OF INVENTION

Problems to be Solved by the Invention

However, the road surface profile detected based on the acceleration measured by the acceleration sensor will vary depending on the type of vehicle suspension and tires and their condition. Therefore, simply detecting the road surface profile based on the acceleration measured by the acceleration sensor, as in the device described in Patent Literature 1 above, does not sufficiently evaluate the road surface profile.

Means for Solving Problem

An aspect of the present invention is a road surface evaluation apparatus including: a driving information acquisition unit configured to acquire driving information including information indicating a motion of a vehicle while driving and position information of the vehicle; a map information acquisition unit configured to acquire map information including information on a road on which the vehicle is traveling; a vehicle information acquisition unit configured to acquire vehicle information including unique information of the vehicle; a roughness value derivation unit configured to derive a roughness value indicating a roughness of a road surface of the road on which the vehicle is traveling based on the driving information acquired by the driving information acquisition unit; a roughness value correction unit configured to correct the roughness values derived by the roughness value derivation unit based on the vehicle information acquired by the vehicle information acquisition unit; and an output unit configured to output the roughness value corrected by the roughness value correction unit in association with the road information acquired by the map information acquisition unit.

Another aspect of the present invention is a road surface evaluation method, including causing a computer to execute steps of: acquiring driving information including information indicating a motion of a vehicle while driving and position information of the vehicle; acquiring map information including information on a road on which the vehicle is traveling; acquiring vehicle information including unique information of the vehicle; deriving a roughness value indicating a roughness of a road surface of the road on which the vehicle is traveling based on the acquired driving information; correcting the roughness values derived by the roughness value derivation unit based on the acquired vehicle information; and outputting the roughness value corrected by the roughness value correction unit in association with the acquired road information.

Effect of the Invention

According to the present invention, road surface profiles can be adequately evaluated.

DESCRIPTION OF EMBODIMENT

Figure 1:
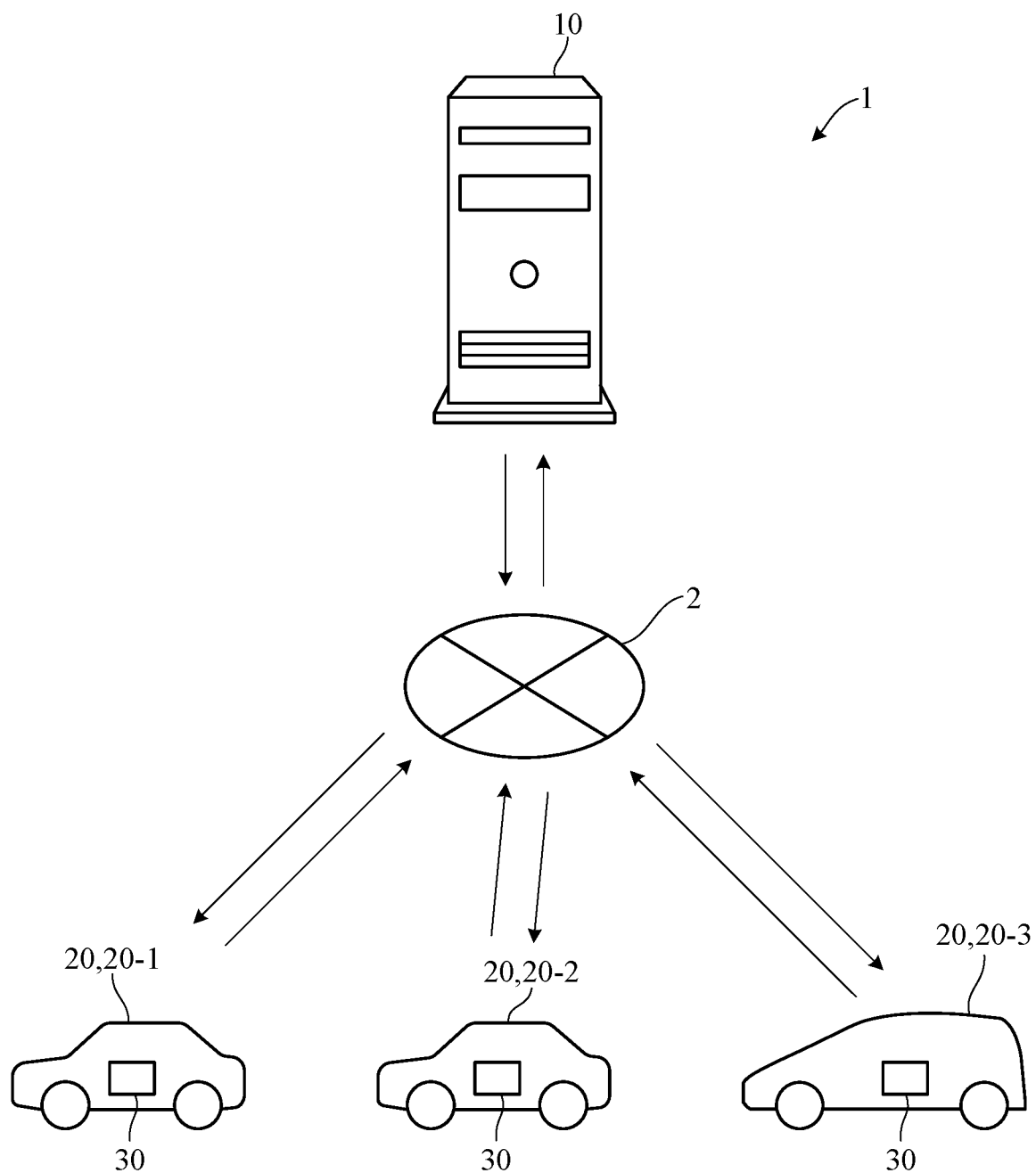
FIG. 1 is a diagram illustrating an example of a configuration of a road surface evaluation system including a road surface evaluation apparatus according to an embodiment of the present invention.

The road surface evaluation apparatus according to the present embodiment is a device for evaluating the road surface profile of a road on which a vehicle is traveling. FIG. 1 illustrates an example of the configuration of a road surface evaluation system including a road surface evaluation apparatus according to the present embodiment. As illustrated in FIG. 1, the road surface evaluation system 1 includes a road surface evaluation apparatus 10 and an in-vehicle device 30. The road surface evaluation apparatus is configured as a server device. The in-vehicle device 30 is configured to communicate with the road surface evaluation apparatus 10 via a communication network 2.

The communication network 2 includes not only public wireless communication networks represented by Internet networks and cell phone networks, but also closed communication networks established for each predetermined administrative region, such as wireless LAN, Wi-Fi (registered trademark), and Bluetooth (registered trademark).

The in-vehicle device 30 is installed in various of vehicles 20. The vehicle 20 includes a vehicle 20-1, a vehicle 20-2, and a vehicle 20-3. The vehicles 20-1 and 20-2 are the same model but of different grades, with the vehicle 20-1 having a lower grade than the vehicle 20-2. The model of the vehicle 20-3 is different from that of the vehicles 20-1 and 20-2. The model of the vehicle 20-3 is more comfortable to ride than the models of the vehicle 20-1 and 20-2. The number of vehicles included in the vehicle 20 is not limited to three, and the vehicle 20 may include vehicles other than vehicles 20-1 to 20-3.

Figure 2:
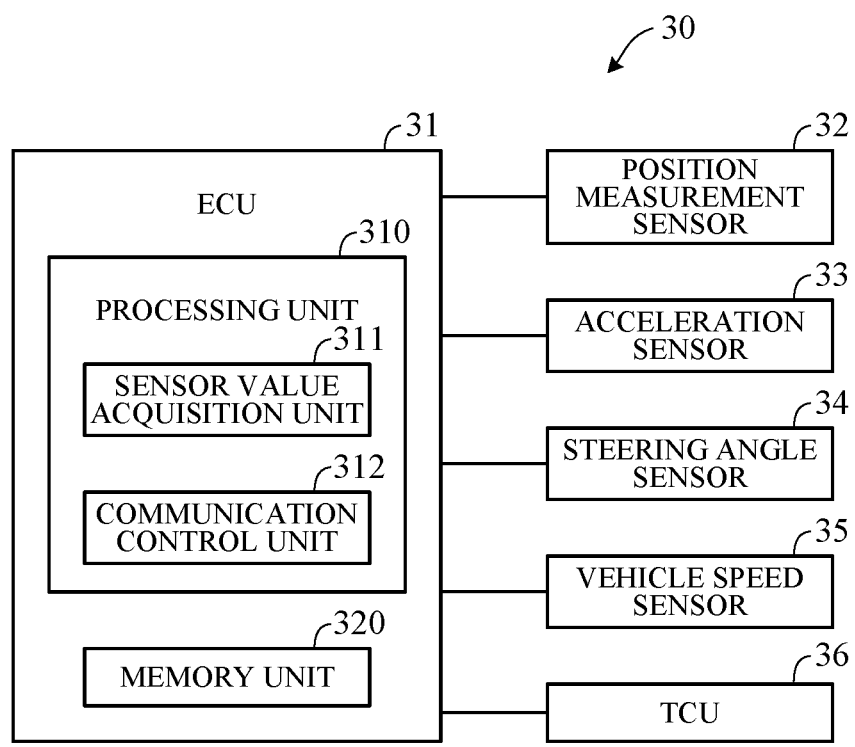
FIG. 2 is a block diagram illustrating key components of an in-vehicle device.

FIG. 2 is a block diagram illustrating the key components of the in-vehicle device 30 according to the present embodiment. The in-vehicle device 30 has an electronic control unit (ECU) 31, a position measurement sensor 32, an acceleration sensor 33, a steering angle sensor 34, a vehicle speed sensor 35, and a telematic control unit (TCU) 36.

The position measurement sensor 32 is, for example, a GPS sensor, which receives positioning signals transmitted from GPS satellites and detects the absolute position (e.g., latitude and longitude) of the vehicle 20. The position measurement sensor 32 includes not only GPS sensors but also sensors that use radio waves transmitted from satellites in various countries, known as GNSS satellites, including quasi-zenith orbit satellites. Alternatively, the vehicle position may be determined by a hybrid method with inertial navigation.

The acceleration sensor 33 detects the acceleration of the vehicle 20 in the left-right directions, that is, lateral acceleration. The acceleration sensor 33 may be configured to detect acceleration in the front-back direction and vertical direction as well as lateral acceleration of the vehicle 20. The steering angle sensor 34 detects the steering angle of the steering wheel (not shown) of the vehicle 20. The vehicle speed sensor 35 detects the vehicle speed of the vehicle 20.

As illustrated in FIG. 2, the ECU 31 includes a computer including a processing unit 310 such as a CPU (processor), a memory unit 320 such as ROM and RAM, and other peripheral circuits such as I/O interfaces not illustrated. The processing unit 310 functions as a sensor value acquisition unit 311 and a communication control unit 312 by executing a program stored in the memory unit 320 in advance.

The sensor value acquisition unit 311 acquires information (values) detected by each of the sensors 32 to 34, that is, driving information. The sensor value acquisition unit 311 acquires driving information including the acceleration of the vehicle 20 detected by the acceleration sensor 33 and the absolute position of the vehicle 20 detected by the position measurement sensor 32 at a predetermined cycle, for example, every 10 ms. The driving information includes at least the lateral acceleration of the vehicle 20 detected by the acceleration sensor 33. The communication control unit 312 transmits the driving information acquired by the sensor value acquisition unit 311 to the road surface evaluation apparatus 10 via the TCU 36. At this time, the communication control unit 312 transmits the driving information acquired by the sensor value acquisition unit 311 at a predetermined cycle. More specifically, the communication control unit 312 sends the driving information acquired by the sensor value acquisition unit 311 in intervals of, for example, 1 s so as not to increase the processing load and not to unnecessarily squeeze the bandwidth of the communication network 2.

The road surface evaluation apparatus 10 detects unevenness of the road surface, or road surface profile, based on the detected values by the acceleration sensor 33 of the vehicle 20. The detected road surface profile is output to a terminal owned by, for example, a road management company, and is used as reference data by the road management company when considering whether or not repairs are necessary. Specifically, the detected values of the acceleration sensor are used to evaluate the road surface profile.

However, as described above, the road surface profile detected based on the acceleration measured by the vehicle's acceleration sensor will vary depending on the type of vehicle suspension and tires and their condition. Therefore, it is difficult to adequately evaluate the road surface profile with the road surface profile detected based on the acceleration sensor included in the vehicle 20. Therefore, in the present embodiment, the road surface evaluation apparatus is configured as follows so that the road surface profile can be adequately evaluated.

Figure 3:
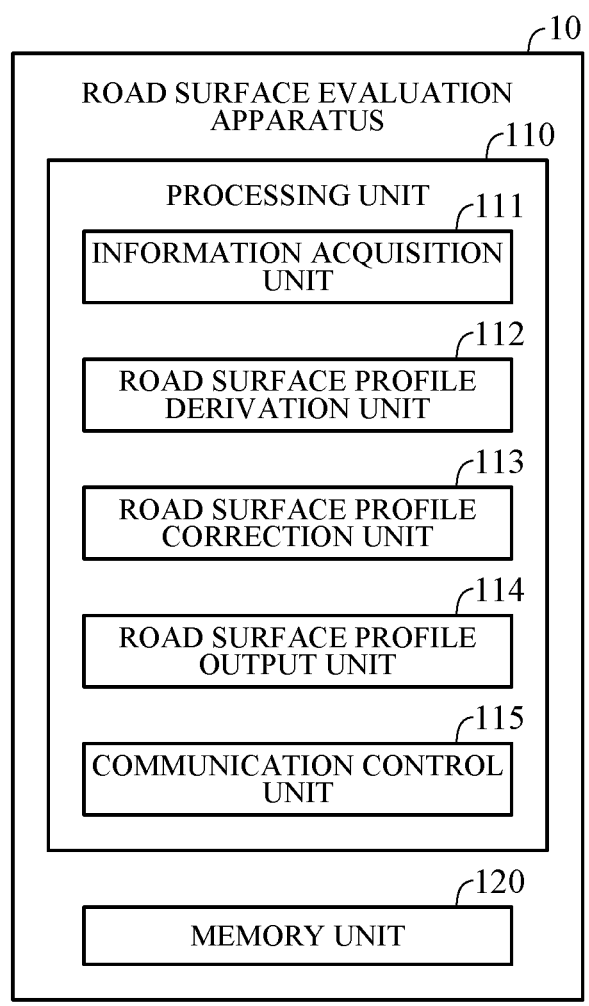
FIG. 3 is a block diagram illustrating key components of the road surface evaluation apparatus according to the embodiment of the present invention.

FIG. 3 is a block diagram illustrating the key components of the road surface evaluation apparatus 10 according to the present embodiment. The road surface evaluation apparatus 10 is configured to include a computer including a processing unit 110, such as a CPU, a memory unit 120 such as ROM and RAM, and other peripheral circuits such as I/O interfaces not illustrated. The memory unit 120 stores map information including road maps, and various information processed by the processing unit 110.

The processing unit 110 functions as an information acquisition unit 111, a road surface profile derivation unit 112, a road surface profile correction unit 113, road surface profile output unit 114, and a communication control unit 115 by executing programs stored in the memory unit 120.

The information acquisition unit 111 acquires information indicating the motion of the vehicle 20, which includes acceleration of the vehicle 20 in each direction, and driving information including the position information of the vehicle 20. The information acquisition unit 111 receives driving information from the in-vehicle device 30 of the vehicle 20 traveling on the road via the communication control unit 115. Information indicating the motion of the vehicle 20 is a mixture of information indicating the roll motion of the vehicle, information indicating the motion due to centrifugal force, and information indicating the motion due to road surface unevenness. Roll motion is a rotational motion around the center of gravity axis in the front-back direction of the vehicle, that is, the left-right oscillating motion of the vehicle. The driving information includes the identification information of the vehicle 20 that is the transmission source (hereinafter referred to as vehicle identification information). The vehicle identification information is information that can identify at least one of the model or grade of the vehicle 20, for example, the VIN (Vehicle Identification Number).

The information acquisition unit 111 acquires map information from the memory unit 120, including information on the road on which the vehicle 20 is traveling.

The information acquisition unit 111 acquires vehicle information including unique information of the vehicle 20.

The unique information of the vehicle 20 is information that can identify the type or state of a predetermined component constituting the vehicle 20. A predetermined component of the vehicle 20 is a component that affects the motion of the vehicle 20 while it is traveling, such as suspension and tires. The type of component is, for example, the type of suspension distinguished by spring rate and others, or the type of tire distinguished by flatness, width, and rubber hardness. The condition of a component is the condition of the component that changes depending on the period of use or the like, and is, for example, the hardness of a suspension or tire. Information that can identify the condition of a component is, for example, the year of manufacture of the vehicle.

The road surface profile derivation unit 112 derives roughness information indicating the amount of unevenness (depth or height) of the road surface, or road surface roughness, based on the driving information acquired by the information acquisition unit 111. Roughness information is a road surface roughness value that indicates the degree of roughness of the road surface, for example, the value expressed by the International Roughness Index (IRI), which is an international index. Hereinafter, the road surface roughness values may be simply referred to as roughness values.

In general, the greater the amount of unevenness of the road surface, the greater the lateral acceleration of the vehicle 20, and the road surface roughness value and lateral acceleration have a certain correlation. The road surface profile derivation unit 112 uses this correlation to derive the road surface roughness value corresponding to the vehicle position on the road from the lateral acceleration. Specifically, the road surface profile derivation unit 112 first derives a correlation between road surface roughness values and lateral acceleration based on the previously measured road surface roughness values and lateral acceleration.

Figure 4A:
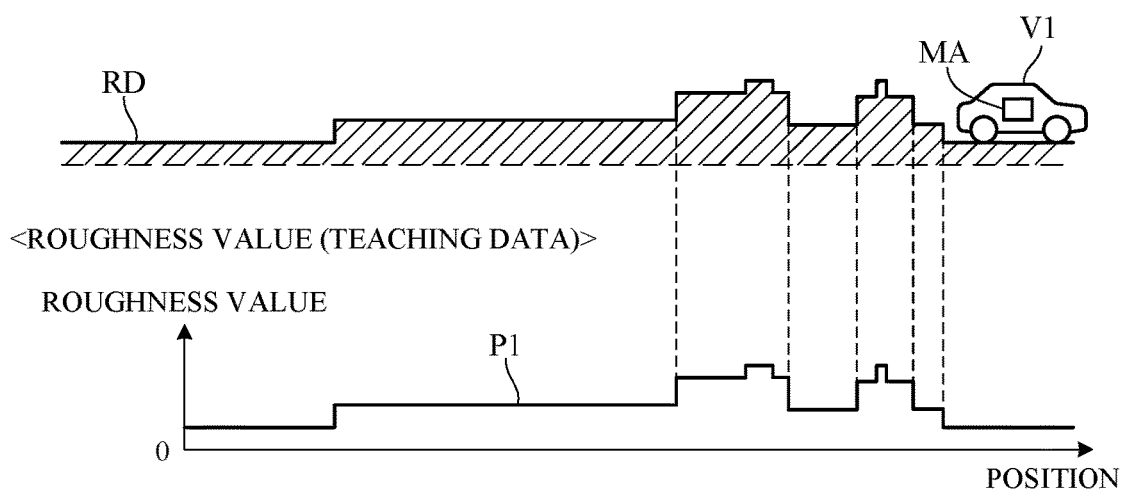
FIG. 4A is a diagram illustrating how correlation between road surface roughness values and lateral acceleration is derived.
Figure 4B:
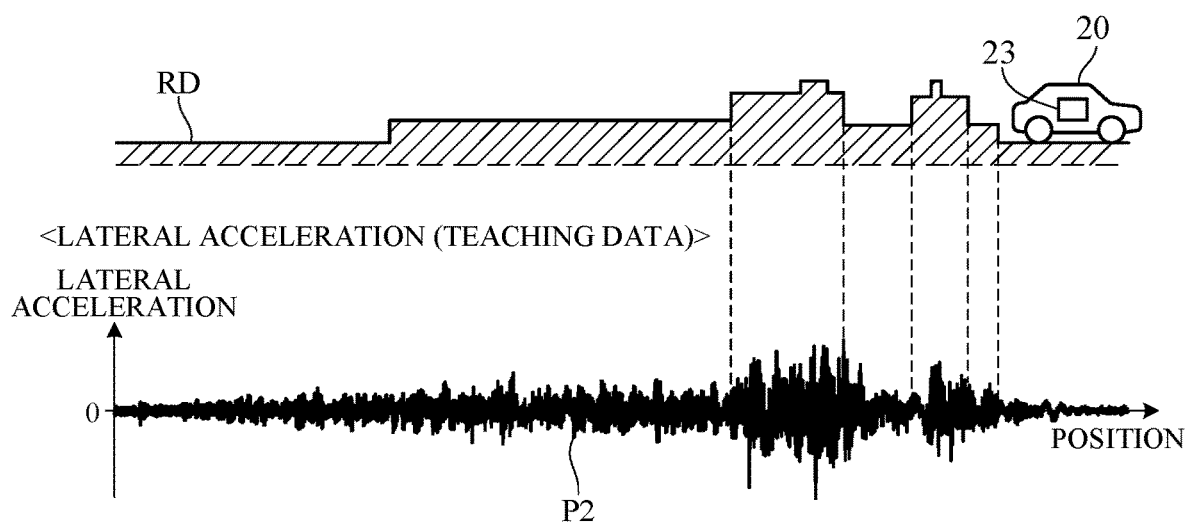
FIG. 4B is a diagram illustrating how correlation between road surface roughness values and lateral acceleration is derived.

FIGS. 4A and 4B illustrate how the correlation between road surface roughness values and lateral acceleration is derived. A vehicle V1 illustrated in FIG. 4A is a specialized vehicle including a measuring instrument MA that measures road surface roughness. The measuring instrument MA measures the road surface roughness values of the road RD when the vehicle V1 is traveling on a predetermined road (such as a course for measurement) RD. Characteristic P1 in FIG. 4A represents the road surface roughness values measured at this time.

FIG. 4B illustrates the vehicle 20 in FIG. 1 traveling on the same road RD as that in FIG. 4A. A waveform P2 in FIG. 4B indicates the lateral acceleration detected every 10 ms by the acceleration sensor 33 installed in the vehicle 20 while the vehicle 20 is traveling on the predetermined road RD. Hereafter, the vehicle 20 used to derive the correlation will be referred to as reference vehicle. In the present embodiment, the vehicle 20-1 is used as the reference vehicle.

The road surface profile derivation unit 112 derives a correlation between the road surface roughness values and lateral acceleration based on the road surface roughness values measured using the vehicle V1 and the lateral acceleration measured using the vehicle 20-1, which is the reference vehicle, and stores information indicating the correlation in the memory unit 120. When deriving the correlation, a plurality of vehicles of the same model and grade as the vehicle 20-1 may be prepared, and the lateral acceleration measured from each of the reference vehicles may be used to derive the correlation. More specifically, statistical data (for example, average values) of lateral acceleration measured from each of the reference vehicles may be used to derive the correlation. This allows more accurate derivation of the correlation between road surface roughness values and lateral acceleration.

Figure 5A:
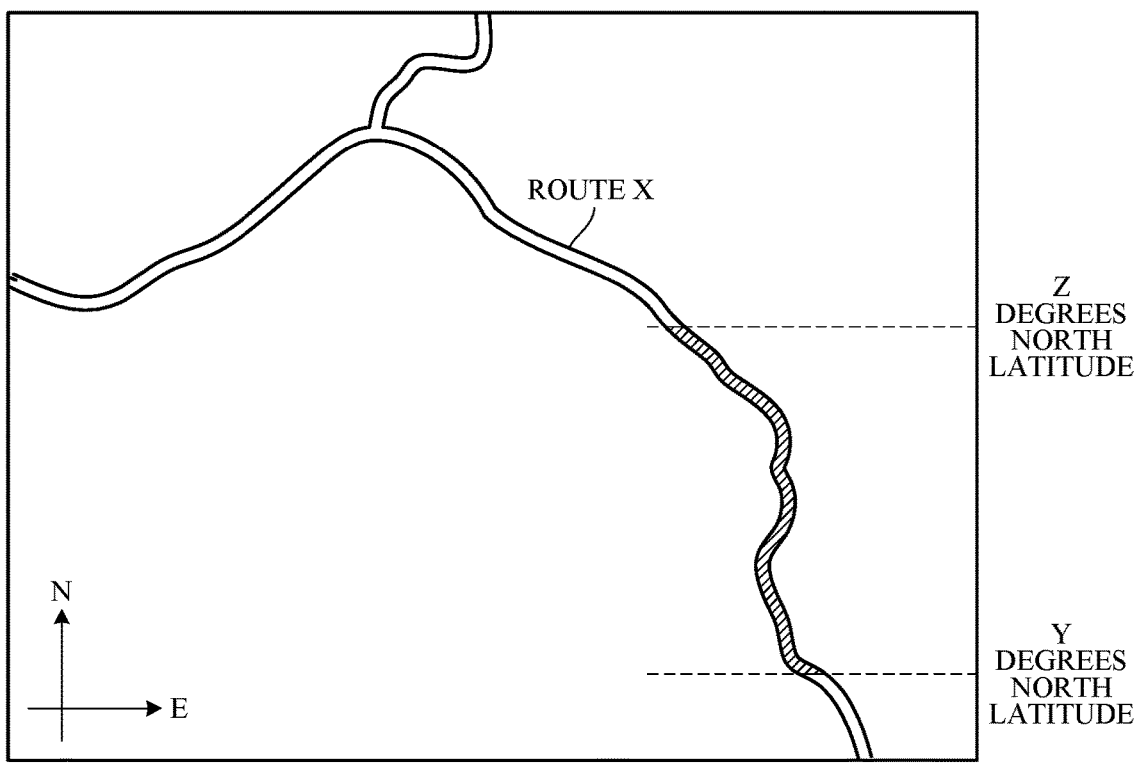
FIG. 5A is a diagram illustrating an example of a map of a road on which a vehicle is traveling.
Figure 5B:
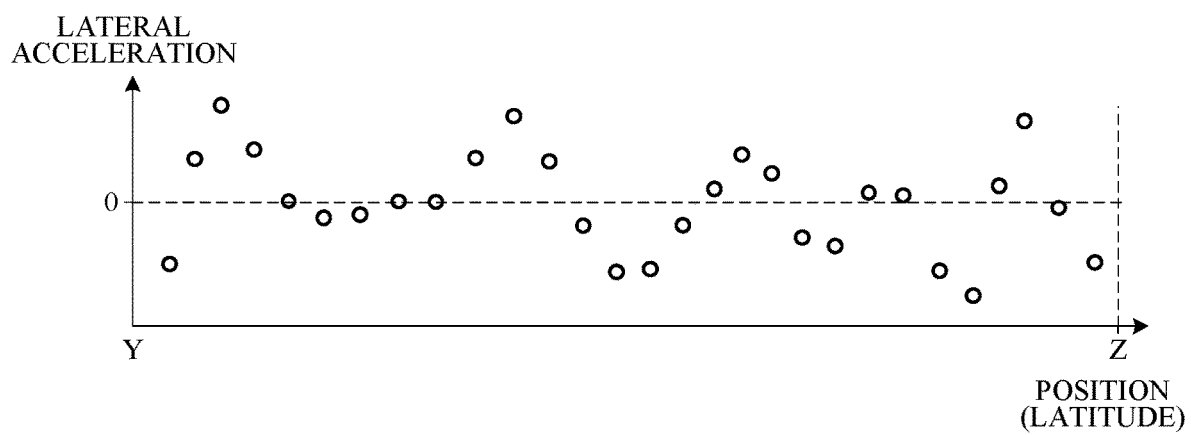
FIG. 5B is a diagram illustrating an example of driving information acquired by the road surface evaluation apparatus from the in-vehicle device of the vehicle that traveled the road in FIG. 5A.

FIG. 5A illustrates an example of a map of the road on which the vehicle 20 is traveling. FIG. 5A illustrates the predetermined road the section of latitude Y to Z on National Route X from which the road surface roughness values are derived. In FIG. 5A, the upper direction corresponds to the north direction, and the right direction corresponds to the east direction. The range of road surface roughness values to be derived can be specified by the user as described below. When the road to be used for deriving road surface roughness values has a plurality of lanes on each side, the user specifies the lanes to be used for deriving road surface roughness values. FIG. 5B illustrates an example of driving information acquired by the road surface evaluation apparatus 10 from the in-vehicle device 30 of the vehicle 20 that traveled the predetermined road (the section of latitude Y to Z on National Route X) in FIG. 5A. The horizontal axis in the figure is the position (latitude) of the vehicle 20 in the driving direction along the driving lane, and the vertical axis is the lateral acceleration of the vehicle 20.

Figures 6, 7:
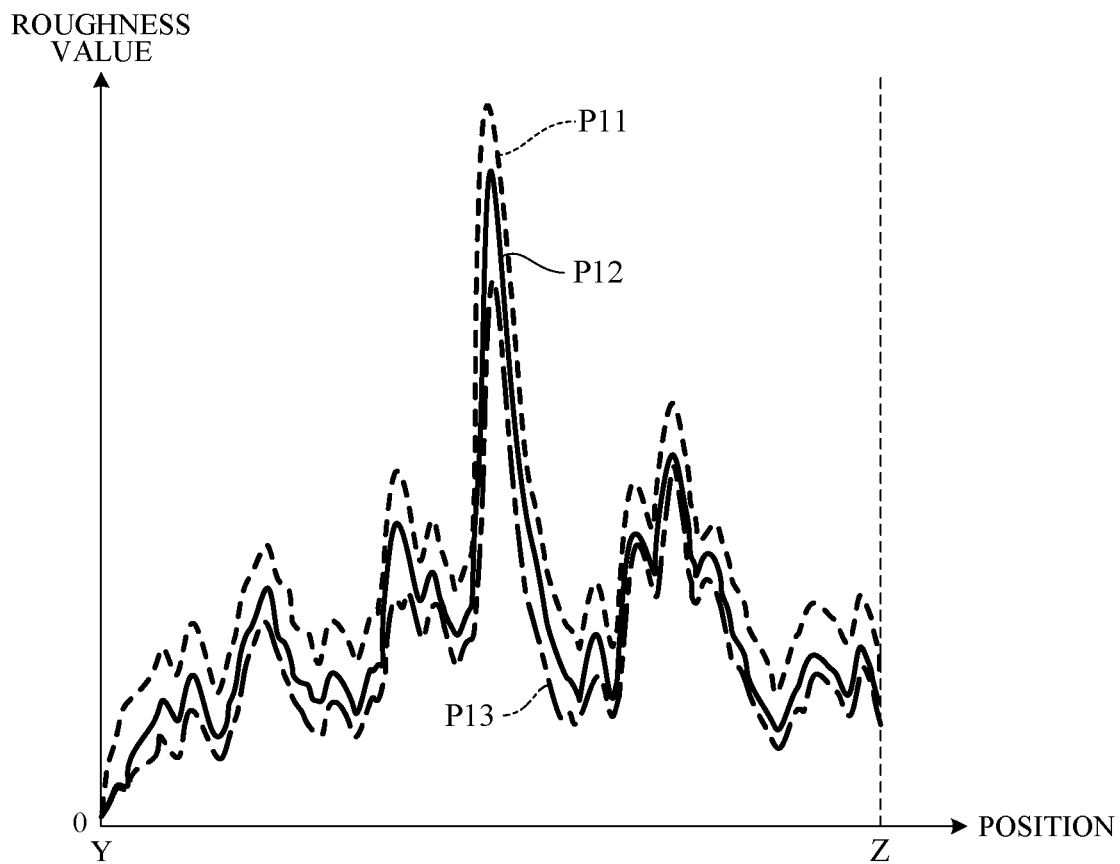
FIG. 6 is a diagram illustrating an example of road surface roughness values derived based on driving information acquired from the in-vehicle device of the vehicle traveling on the road in FIG. 5A.
FIG. 7 is a diagram illustrating an example of vehicle information.

FIG. 6 illustrates an example of road surface roughness values derived based on driving information acquired from the in-vehicle device 30 of the vehicle 20 traveling on the above predetermined road. Characteristic P11 illustrated in FIG. 6 represents the road surface roughness values derived from the driving information acquired from the in-vehicle device 30 of the vehicle 20-1. Characteristic P12 represents the road surface roughness values derived from the driving information acquired from the in-vehicle device 30 of the vehicle 20-2. Characteristic P13 represents the road surface roughness values derived from the driving information acquired from the in-vehicle device 30 of the vehicle 20-3.

As illustrated in FIG. 6, even when the vehicles 20-1, 20-2, and 20-3 travel on the same road, the road surface roughness values derived by the road surface profile derivation unit 112 are different when the model and grade of the vehicle are different. The reason for this is that the suspension, tires, and other components installed in each vehicle that affect the vehicle's motion are different for each model and grade.

Usually, the lower the shock-absorbing performance (vertical shock absorption performance) of the suspension and tires, the more easily shocks and vibrations caused by unevenness of the road surface are transmitted to the vehicle, and the greater the lateral acceleration detected by the acceleration sensor 33 on the vehicle 20. Usually, the shock-absorbing performance of suspension and tires increases with the grade between the same models, and with the ride comfort between different models.

Thus, as illustrated in FIG. 6, the characteristic P13 corresponding to the vehicle 20-3, which is a model that emphasizes ride comfort, is lower than the characteristics P11 and P12 corresponding to the vehicles 20-1 and 20-2. As illustrated in FIG. 6, the characteristic P12 corresponding to the vehicle 20-2, which has a higher grade than the vehicle 20-1, is lower than the characteristic P11 corresponding to the vehicle 20-1. As a result of this, even when the vehicles 20-1, 20-2, and 20-3 travel on the same road, variation occurs in the road surface roughness values derived from the driving information (lateral acceleration) of each vehicle. If the road surface roughness values derived from the driving information vary with the model and grade of the vehicle 20, the road surface roughness values cannot be adequately evaluated.

In consideration of this point, in the present embodiment, the model and grade of the vehicle 20 are identified based on the vehicle identification information of the vehicle 20 included in the driving information. Furthermore, the road surface roughness values derived from the driving information of each vehicle are corrected using the correction factors corresponding to the identified model and grade.

FIG. 7 illustrates an example of vehicle information. The vehicle information illustrated in FIG. 7 is created in advance and stored in the memory unit 120. The vehicle information includes information indicating the type of suspension and tires of the vehicle and the correction factors corresponding to the type, in association with the model and grade.

The road surface profile correction unit 113 drives the vehicle 20 of different models and grades on a predetermined road (road RD in FIG. 4A) in advance. The road surface profile correction unit 113 determines correction factors corresponding to the suspension and tire type of each vehicle based on the ratio of the road surface roughness values of each vehicle derived from the driving information of each vehicle. Thus, the road surface profile correction unit 113 also functions as a correction factor determination unit.

The road surface profile correction unit 113 stores the information (vehicle information in FIG. 7) in the memory unit 120, which correlates the determined correction factors to the model and grade. The road surface profile correction unit 113 determines the correction factor for each vehicle, with the correction factor for the vehicle 20-1, which is the reference vehicle, being 1.0. For example, if the model of the vehicle 20-1 is "ABC" and the grade is "standard," the correction factors α12 and β12 for suspension and tires, respectively, in FIG. 7 are 1.0.

As described above, the shock-absorbing performance of suspension and tires increases with the grade between the same models, and with the ride comfort between different vehicle types. Therefore, if the model "ABC" is a more comfortable ride than the model "XYZ" in the example in FIG. 7, then the relationship between the suspension correction factors α11, α12, α13 and α21 is α13>α12(=1.0)>α11>α21. Similarly, the relationship between the correction factors β11, β12, β13, and β21 for tires is β13>β12(=1.0)>β11>β21.

In some models, all grades may be equipped with the same suspension and tires. In such cases, the correction factors for each grade of suspension may have the same value, and the correction factors for each grade of tires may have the same value. In some cases, different models may be equipped with the same suspension and tires, and in such cases, the same correction factors are set for different models. For example, if a vehicle with model "XYZ" and grade "high" is equipped with suspension "SS_13", the correction factor for suspension of a vehicle with model "XYZ" and grade "high" is α13, which is the same as that of a vehicle with model "ABC" and grade "low".

The road surface profile correction unit 113 corrects the road surface roughness values derived by the road surface profile derivation unit 112. In more detail, first, the road surface profile correction unit 113 identifies the model and grade of the vehicle 20, which is the source of the driving information, based on the vehicle identification information of the vehicle 20 included in the driving information acquired by the information acquisition unit 111. The road surface profile correction unit 113 acquires the vehicle information corresponding to that model and grade from the memory unit 120.

Next, the road surface profile correction unit 113 acquires the correction factor from the vehicle information of the vehicle 20. For example, when the model of the vehicle 20 is "ABC" and the grade is "low", α13 is acquired as the correction factor for the suspension and β13 as the correction factor for the tires.

Finally, the road surface profile correction unit 113 corrects the road surface roughness values by multiplying the readout correction factor by the road surface roughness values derived by the road surface profile derivation unit 112. The road surface profile correction unit 113 stores the corrected road surface roughness values (hereinafter referred to as corrected road surface roughness values) in the memory unit 120 in chronological order.

The road surface profile output unit 114 outputs the corrected road surface roughness values stored in chronological order in the memory unit 120 and associated with the road information acquired by the information acquisition unit 111.

The communication control unit 115 controls a communication unit (not illustrated) to transmit and receive data to and from external devices and others. In more detail, the communication control unit 115 transmits and receives data via the communication network 2 to and from the in-vehicle device 30 of the vehicle 20 and terminals of road management companies or the like. The communication control unit 115 also receives, via the communication network 2, a road surface profile output instruction described below from the terminals of road management companies or the like. In addition, the communication control unit 115 acquires map information and other information from various servers connected to the communication network 2 periodically or at arbitrary times. The communication control unit 115 then stores the information acquired from the various servers in the memory unit 120.

Figure 8:
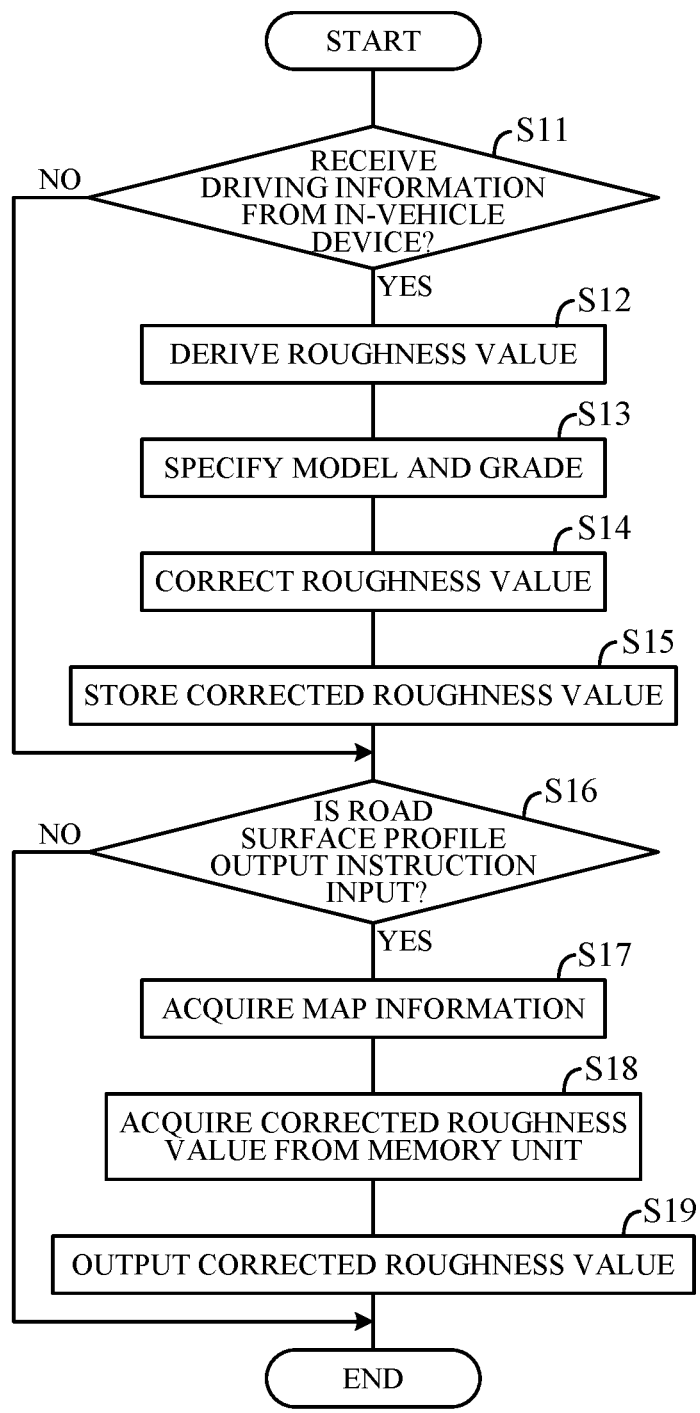
FIG. 8 is a flowchart illustrating an example of processing executed by the processing unit in FIG. 3.

FIG. 8 is a flowchart illustrating an example of processing executed by the processing unit 110 (CPU) of the road surface evaluation apparatus 10 according to a predetermined program. The processing illustrated in this flowchart is repeated at a predetermined cycle while the road surface evaluation apparatus 10 is running. First, in step S11, it is determined whether driving information has been received from the in-vehicle device 30 of the vehicle 20. If NO in step S11, the processing proceeds to step S16. If YES in step S11, the road surface roughness values are derived in step S12 based on the driving information received in step S11.

In step S13, the model and grade of the vehicle 20 are identified based on the vehicle identification information included in the driving information received in step S11, and the vehicle information corresponding to the model and grade is acquired from the memory unit 120. In step S14, the road surface roughness values derived in step S12 are corrected with the correction factor included in the acquired vehicle information, that is, those corresponding to the model and grade of the vehicle 20. In step S15, the corrected road surface roughness value is stored in the memory unit 120. At this time, the position information of the vehicle 20 included in the driving information received in step S11 is stored in the memory unit 120 in association with the corrected road surface roughness value.

In step S16, it is determined whether or not a road surface profile output instruction has been input (received). The road surface profile output instruction is, for example, sent to the road surface evaluation apparatus 10 from a terminal of the user (for example, road management company) via the communication network 2. The road surface profile output instruction may be input to the road surface evaluation apparatus 10 via a control unit (not illustrated) included in the road surface evaluation apparatus 10.

The road surface profile output instruction includes road section information that can identify the road section to be output. The section information is information that indicates the name and section of the road to be output, for example, "road: National Route X, section: latitude Y to Z". When the road has a plurality of lanes on each side, such as two lanes on one side, the section information may include information on the lane to be output, such as "road: National Route X, lane: right end, section: latitude Y to Z". Information other than latitude may be used to specify the section to be output. For example, longitude may be used instead of latitude or in addition to latitude. The distance from the starting point (for example, the point of longitude Y on National Route X) may also be used.

If NO in step S16, the processing ends. If YES in step S16, in step S17, map information is read from the memory unit 120 and information on roads included in the map information is acquired. In step S18, the corrected road surface roughness values of the vehicle 20 is acquired from the memory unit 120. More specifically, based on the section information included in the road surface profile output instruction and the road information acquired in step S17, the corrected road surface roughness values for the section to be output, which are stored in the memory unit 120, are acquired from the memory unit 120. At this time, the position information of the vehicle 20, which is stored in the memory unit 120 in association with the corrected road surface roughness value, is also acquired.

Finally, in step S19, the corrected road surface roughness values acquired in step S18 are output in association with the road information acquired in step S17. More specifically, based on the information on the road acquired in step S17 and the position information of the vehicle 20 associated with the corrected road surface roughness values, the corrected road surface roughness values acquired in step S18 are output in association with each position in the section to be output. Hereinafter, the information output at this time is referred to as road surface profile information. The road surface profile information is output via the communication network 2 to the terminal from which the road surface profile output instruction is sent or to a predetermined output destination terminal. The road surface profile information is information that can be displayed on a display device such as a display, and users can check and evaluate road surface profiles by displaying the road surface profile information on a display included in the user's terminal. Even if NO in step S16, when the corrected road surface roughness values for the vehicle 20 stored in the memory unit 120 that have not been output have accumulated more than a predetermined amount, the processing may proceed to step S17. Even if YES in step S16, the processing may end when the corrected road surface roughness values for the vehicle 20 stored in the memory unit 120 that have not been output are less than a predetermined amount. At that time, information (text information, voice information, or image information) to notify that the corrected road surface roughness values that have not been output is less than a predetermined amount may be output to the terminal or other device from which the road surface profile output instructions were sent.

According to the embodiment of the present invention, the following effects can be achieved.

(1) A road surface evaluation apparatus 10 includes: an information acquisition unit 111 that acquires driving information including information indicating the motion of a vehicle 20 while traveling and position information of the vehicle 20, a map information including information on a road on which the vehicle is traveling, and vehicle information including unique information of the vehicle 20; a road surface profile derivation unit 112 that derives road roughness values indicating the roughness of the road surface of the road on which the vehicle 20 is traveling based on the driving information acquired by an information acquisition unit 111; a road surface profile correction unit 113 that corrects the road surface roughness values derived by the road surface profile derivation unit 112 based on the vehicle information acquired by the information acquisition unit 111; and an output unit that outputs the road surface roughness values corrected by the road surface profile correction unit 113 in association with the road information acquired by the information acquisition unit 111 (FIG. 3).

This configuration allows the derivation of road surface profiles that can be adequately evaluated independent of the type of the vehicle 20 traveling on the road. This configuration also allows sufficient evaluation of the road surface profile of a road using driving information of general vehicles without using a special vehicle for road surface profile measurement. Furthermore, users such as road management companies can estimate which roads need to be repaired based on the road surface profile output by the road surface evaluation apparatus 10 without having to visit the site, thereby reducing the cost of road management.

(2) The road surface evaluation apparatus 10 further includes the memory unit 120 that stores vehicle information. The information acquisition unit 111 acquires vehicle information from the memory unit 120 based on the vehicle identification information included in the acquired driving information. This allows real-time acquisition of vehicle information on the vehicle 20 during traveling and real-time correction of road surface roughness values.

(3) The unique information on the vehicle 20 includes information on the type and grade of the vehicle 20. This allows correction of the road surface roughness values derived from the driving information on the vehicle 20 according to the type and grade of the vehicle 20, and highly accurate correction of the road surface roughness values independent of the model and grade of the vehicle 20.

(4) The information on the grade includes information on type of any one of suspension and tire of the vehicle. This allows correction of the road surface roughness values derived from the driving information on the vehicle according to the type of suspension and tires installed on the vehicle, and highly accurate correction of the road surface roughness values independent of the suspension and tires installed on the vehicle.

(5) The road surface profile correction unit 113 determines correction factors for correcting the road surface roughness values derived by the road surface profile derivation unit 112 based on driving information acquired from each vehicle when a plurality of vehicles are driven on a predetermined road (road RD in FIG. 4A) in advance. The vehicle information includes correction factors associated with the unique information of the vehicle 20. The road surface profile correction unit 113 corrects the road surface roughness values derived by the road surface profile derivation unit 112 using the correction factors included in the vehicle information acquired by the information acquisition unit 111. This allows correction of road surface roughness values derived from vehicle driving information using correction factors that correspond to each vehicle. Therefore, even when there are a plurality of traveling vehicles, the road surface roughness values derived from driving information on each vehicle can be corrected with high accuracy.

(6) The road surface evaluation apparatus 10 of the present embodiment can also be used as a road surface evaluation method. The road surface evaluation method includes having a computer execute the steps of: acquiring driving information including information indicating the motion of a vehicle 20 during traveling and position information of the vehicle 20; acquiring map information including information on the road on which the vehicle 20 is traveling; acquiring vehicle information including unique information of the vehicle 20; deriving roughness values indicating the roughness of the road surface on which the vehicle 20 is traveling, based on the acquired driving information; correcting the derived road surface roughness values based on the acquired vehicle information; and outputting the corrected road surface roughness values in association with the acquired road information. This allows deriving a road surface profile that can be adequately evaluated independent of the type of the vehicle 20 traveling on the road.

The above embodiment can be modified into various forms. Hereinafter, modifications will be described. In the above embodiment, the information acquisition unit 111 functions as a driving information acquisition unit to acquire the lateral acceleration of the vehicle 20 detected by the acceleration sensor 33 as information indicating the motion of the vehicle 20. However, information indicating the motion is not limited to the lateral acceleration of the vehicle 20 detected by the acceleration sensor 33. In other words, any configuration of the driving information acquisition unit may be used as long as it acquires information indicating the motion of the vehicle 20. For example, the vehicle speed of the vehicle 20 detected by the vehicle speed sensor 35 and the steering angle of the vehicle 20 detected by the steering angle sensor 34 may be acquired as information indicating motion.

In the above embodiment, the road surface profile derivation unit 112 functions as a roughness value derivation unit to derive road surface roughness values based on the lateral acceleration of the vehicle 20 detected by the acceleration sensor 33. However, any configuration of the roughness value derivation unit may be used as long as it derives the road surface roughness values of the road on which the vehicle 20 is traveling.

In the above embodiment, the information acquisition unit 111 functions as a map information acquisition unit to acquire map information from the memory unit 120, including information on the road on which the vehicle 20 is traveling, but the map information may be stored on an external server or external storage device. In other words, any configuration of the map information acquisition unit may be used as long as it acquires map information that includes information on the road on which the vehicle 20 is traveling.

In the above embodiment, the information acquisition unit 111 functions as a vehicle information acquisition unit to acquire vehicle information including unique information of the vehicle 20 from the memory unit 120, but the vehicle information may be stored on an external server or external storage device. In other words, any configuration of the vehicle information acquisition unit may be used as long as it acquires vehicle information including information on the road on which the vehicle 20 is traveling.

In the above embodiment, the road surface profile correction unit 113 functions as a roughness value correction unit to correct the road surface roughness value derived by the road surface profile derivation unit 112 using a correction factor. However, the roughness value correction unit may correct road surface roughness values using correction formulas or tables instead of correction factors. In other words, any configuration of the roughness value correction unit may be used as long as it corrects the road surface roughness values.

The road surface profile correction unit 113 may correct the road surface roughness values derived by the road surface profile derivation unit 112 based on the vehicle speed detected by the vehicle speed sensor 35 and the steering angle detected by the steering angle sensor 34. When the vehicle 20 travels on a curved road, the acceleration sensor 33 detects not only the lateral acceleration generated by the unevenness of the road surface, but also the lateral acceleration due to centrifugal force generated by the speed and steering angle of the vehicle 20. Therefore, in such a case, the road surface profile correction unit 113 may correct the road surface roughness values to eliminate the component based on lateral acceleration due to centrifugal force from the road surface roughness values derived based on the lateral acceleration detected by the acceleration sensor 33. This allows accurate derivation of road surface roughness values for roads other than straight lines.

The road surface profile correction unit 113 may also correct the road surface roughness values derived by the road surface profile derivation unit 112 based on the vehicle speed detected by the vehicle speed sensor 35. Even when the vehicle 20 travels on the same road, the lateral acceleration of the vehicle 20 detected by the acceleration sensor 33 varies depending on the vehicle speed during traveling. More specifically, this is because the faster the vehicle speed during traveling, the harder it is for the tires of the vehicle 20 to follow the road surface, and the smaller the lateral acceleration detected by the acceleration sensor 33.

Therefore, the road surface profile correction unit 113 may correct the road surface roughness values derived by the road surface profile derivation unit 112 using the correction factor included in the vehicle information and the correction factor based on the vehicle speed. In such a case, the road surface profile correction unit 113 measures the difference in the road surface roughness values caused by the difference in road surface followability of the vehicle 20 by driving the vehicle 20 at different vehicle speeds on a predetermined road in advance. Based on the measurement results, the road surface profile correction unit 113 determines correction factors according to the vehicle speed of the vehicle 20, and stores the correction factors in the memory unit 120. This configuration allows accurate correction of road surface roughness values independent of the vehicle speed of the vehicle 20.

In the above embodiment, the road surface profile output unit 114 outputs the road surface profile information to the user's terminal as an output unit, but the output unit may output the road surface profile information to the memory unit 120 so that the road surface profile information is mapped to the map information stored in the memory unit 120. That is, any configuration of the output unit is acceptable as long as it outputs road surface profile information.

In the above embodiment, the road surface roughness values are expressed in terms of IRI, but the road surface roughness values may be expressed in terms of other indices. For example, if the road surface roughness values acquired as teaching data are represented in terms of an index other than IRI, the road surface profile derivation unit 112 may derive the road surface roughness values represented by that index.

The vehicle information may also include vehicle maintenance information, including information on vehicle suspension or tire replacement. More specifically, if the suspension or tires of the vehicle have been replaced, the road surface profile correction unit 113 may include information indicating the type of suspension or tires newly installed on the vehicle and the correction factor corresponding to that type in the vehicle information, in association with the vehicle identification information of the vehicle whose suspension or tires were replaced. This allows accurate correction of road surface roughness values derived from vehicle driving information, even when the vehicle suspension or tires have been replaced. When the correction factors corresponding to the type of suspension or tires that have been replaced are not included in the vehicle information, the road surface profile correction unit 113 drives the vehicle with the replaced suspension or tires on the predetermined road (for example, the road RD in FIG. 4A). The road surface profile correction unit 113 determines correction factors corresponding to the newly installed suspension and tire type based on the road surface roughness values derived from the driving information of the vehicle.

The predetermined road used for determining the correction factor is not limited to a course for measurement. General roads may be used in determining correction factors if road surface roughness values have already been derived and the road surface roughness values are highly reliable (above a predetermined value).

Furthermore, the road surface profile correction unit 113 may correct the road surface roughness values derived by the road surface profile derivation unit 112 based on the suspension and tire conditions of the vehicle 20. The conditions of the suspension and tires vary depending on the period of use and other factors. Usually, the longer the suspension and tires are used, the more their shock-absorbing performance deteriorates, and the more easily shocks and vibrations caused by unevenness of road surfaces are transmitted to the vehicle. The use period of the suspension and tires of the vehicle 20 can be predicted to some extent from the year of manufacture of the vehicle 20 and the time of suspension and tire replacement. Therefore, the road surface profile correction unit 113 identifies the year of manufacture of the vehicle 20 from the vehicle identification information of the vehicle 20. Alternatively, the road surface profile correction unit 113 identifies when to replace the suspension and tires based on maintenance information. The road surface profile correction unit 113 may correct the road surface roughness values derived by the road surface profile derivation unit 112 using the correction factors included in the vehicle information and the correction factors based on the year of manufacture of the vehicle 20 and the time of suspension and tire replacement. For example, the correction factors according to the year of manufacture of the vehicle 20 and the time of suspension or tire replacement are set to larger values as the difference between the year of manufacture or the time of replacement and the present time increases.

The above explanation is an explanation as an example and the present invention is not limited to the aforesaid embodiment or modifications unless sacrificing the characteristics of the invention. The aforesaid embodiment can be combined as desired with one or more of the aforesaid modifications. The modifications can also be combined with one another.

REFERENCE SIGNS LIST

10 road surface evaluation apparatus, 20, 20-1 to 20-3 vehicle, 30 in-vehicle device, 110 processing unit, 111 information acquisition unit, 112 road surface profile derivation unit (roughness value derivation unit), 113 road surface profile correction unit (roughness value correction unit), 114 road surface profile output unit (output unit), 120 memory unit

The invention claimed is:

1. A road surface evaluation apparatus, comprising:
an electronic control unit having a microprocessor and a memory connected to the microprocessor, wherein
the microprocessor is configured to perform
acquiring driving information including information indicating a motion of a vehicle while driving and position information of the vehicle, map information including information on a road on which the vehicle is traveling, and vehicle information including unique information of the vehicle;
deriving a roughness value indicating a roughness of a road surface of the road on which the vehicle is traveling based on the driving information;
correcting the roughness value based on the vehicle information; and
outputting the corrected roughness value in association with the road information, wherein
the microprocessor is configured to further perform
determining a correction factor for correcting the roughness value, based on a ratio of roughness values of the road for each of a plurality of vehicles, the roughness values being derived based on the driving information acquired from each of the plurality of vehicles when the plurality of vehicles travel on a course for measurement or a predetermined road whose roughness value has already been derived and has a reliability equal to or higher than a predetermined value,
the vehicle information includes the correction factor in association with the unique information, and
the microprocessor is configured to perform
the correcting including correcting the roughness value based on the unique information included in the vehicle information.

2. The road surface evaluation apparatus according to claim 1, wherein
the memory is configured to store the vehicle information,
the driving information includes vehicle identification information, and
the microprocessor is configured to perform
the acquiring including acquiring the vehicle information from the memory based on the vehicle identification information included in the driving information.

3. The road surface evaluation apparatus according to claim 2, wherein
the vehicle identification information is information capable of identifying a model of the vehicle and a grade of the vehicle, and
the microprocessor is configured to perform
the acquiring including acquiring the vehicle information corresponding to the vehicle while driving from the memory based on the vehicle identification information included in the driving information.

4. The road surface evaluation apparatus according to claim 1, wherein
the vehicle information further includes maintenance information of the vehicle, and
the maintenance information includes information on any one of a suspension and a tire of the vehicle.

5. The road surface evaluation apparatus according to claim 1, wherein
the unique information includes information on a type and grade of the vehicle.

6. The road surface evaluation apparatus according to claim 5, wherein
the information on the grade of the vehicle includes information on the type of any one of a suspension and a tire of the vehicle.

7. The road surface evaluation apparatus according to claim 1, wherein
the correction factor is a first correction factor, and
the microprocessor is configured to perform
the determining including determining a second correction factor according to a vehicle speed of the vehicle based on a difference in roughness values acquired when the vehicle travels at different vehicle speeds; and
the correcting including correcting the roughness value based on the first correction factor and the second correction factor.

8. A road surface evaluation method, comprising:
causing a computer to execute steps of:
acquiring driving information including information indicating a motion of a vehicle while driving and position information of the vehicle, map information including information on a road on which the vehicle is traveling, and vehicle information including unique information of the vehicle;
deriving a roughness value indicating a roughness of a road surface of the road on which the vehicle is traveling based on the driving information;
correcting the roughness value based on the vehicle information; and
outputting the corrected roughness value in association with the road information, wherein
the steps executed by the computer further include determining a correction factor for correcting the roughness value, based on a ratio of roughness values of the road for each of a plurality of vehicles, the roughness values being derived based on the driving information acquired from each of the plurality of vehicles when the plurality of vehicles travel on a course for measurement or a predetermined road whose roughness value has already been derived and has a reliability equal to or higher than a predetermined value,
the vehicle information includes the correction factor in association with the unique information, and
the correcting includes correcting the roughness value based on the unique information included in the vehicle information.

* * * * *